(12) United States Patent
Yabuta et al.

(10) Patent No.: US 8,541,106 B2
(45) Date of Patent: Sep. 24, 2013

(54) GLASS ARTICLE PROVIDED WITH PHOTOCATALYST FILM

(75) Inventors: Takeshi Yabuta, Tokyo (JP); Fumiyoshi Kondo, Tokyo (JP); Masaatsu Kido, Tokyo (JP); Masahiro Hori, Tokyo (JP); Mitsuhiro Kawazu, Tokyo (JP); Kazutaka Kamitani, Tokyo (JP)

(73) Assignee: Nippon Sheet Glass Company, Limited, Tokyo (JP)

( * ) Notice: Subject to any disclaimer, the term of this patent is extended or adjusted under 35 U.S.C. 154(b) by 50 days.

(21) Appl. No.: 13/390,649

(22) PCT Filed: Aug. 17, 2010

(86) PCT No.: PCT/JP2010/005080
§ 371 (c)(1),
(2), (4) Date: Feb. 15, 2012

(87) PCT Pub. No.: WO2011/021383
PCT Pub. Date: Feb. 24, 2011

(65) Prior Publication Data
US 2012/0148832 A1    Jun. 14, 2012

(30) Foreign Application Priority Data
Aug. 17, 2009   (JP) .................................. 2009-188579

(51) Int. Cl.
*B32B 17/06*    (2006.01)

(52) U.S. Cl.
USPC ............................ 428/432; 428/697; 428/702

(58) Field of Classification Search
USPC ......................................... 428/432, 697, 702
See application file for complete search history.

(56) References Cited

U.S. PATENT DOCUMENTS

2006/0116279 A1* 6/2006 Kogoi et al. .................. 502/103
2008/0254975 A1* 10/2008 Kitazaki et al. ............... 502/242

FOREIGN PATENT DOCUMENTS

| EP | 2 127 762 | 12/2009 |
| JP | 9-262483 | 10/1997 |
| JP | 2000-001340 | 1/2000 |
| JP | 2000-271491 | 10/2000 |
| JP | 2006-162711 | 6/2006 |
| JP | 2008-264777 | 11/2008 |
| JP | 2010-134462 | 6/2010 |

* cited by examiner

*Primary Examiner* — David Sample
*Assistant Examiner* — Lauren Colgan
(74) *Attorney, Agent, or Firm* — Hamre, Schumann, Mueller & Larson, P.C.

(57) ABSTRACT

Provided is a glass article that improves the film strength of a photocatalyst film while maintaining the photocatalytic function and the reflection suppressing function of the photocatalyst film. The photocatalyst film on the glass sheet is formed to contain, in mass %, 50 to 82% of silicon oxide particles, 8 to 40% of titanium oxide particles, and 7 to 20% of a binder component composed of silicon oxide. The average particle diameter of the silicon oxide particles is set to at least 5 times the average particle diameter of the titanium oxide particles. The photocatalyst film is formed to have a structure such that some of the silicon oxide particles in the film serve as protruding silicon oxide particles that are not in contact with the glass sheet and that have their top portions protruding from the surrounding titanium oxide particles and being exposed on the surface of the film, while some of the titanium oxide particles are interposed between the glass sheet and the protruding silicon oxide particles.

7 Claims, 4 Drawing Sheets

GLASS ARTICLE PROVIDED WITH PHOTOCATALYST FILM

TECHNICAL FIELD

The present invention relates to a glass article including a glass sheet and a photocatalyst film. More specifically, the present invention relates to an improvement in the film strength of a photocatalyst film having an optical reflection suppressing function together with a photocatalyst function.

BACKGROUND ART

Glass sheets making use of a photocatalytic function due to a titanium oxide film are manufactured and are commercially available, as so-called "self-cleaning glass". As is well known, the photocatalytic function of the titanium oxide film allows organic substances adhered to the surface of a glass sheet to be decomposed and weakens the adherence of the organic substances, thus enabling the organic substances to be washed away by rain water, etc.

Since the refractive index of titanium oxide (which is about 2.5 in the case of anatase type) is higher than the refractive index of glass, the optical reflectance of the glass sheet increases by forming a titanium oxide film on the surface of the glass sheet. Hence, in consideration of an application where such an increase in optical reflectance is particularly undesirable (e.g., use in a solar cell or a greenhouse), a photocatalyst film capable of suppressing the increase in optical reflectance has been proposed. In this photocatalyst film, the refractive index of the film is reduced by adding into the film silicon oxide particles having a lower refractive index than the titanium oxide particles, together with titanium oxide particles.

JP 2006-162711A (Patent Literature 1) discloses, as shown in FIG. 6, a photocatalyst film 11 composed of silicon oxide particles 16 of submicron size to which titanium oxide particles 15 of nano size are adhered (claim 1; and FIG. 1). According to Patent Literature 1, the photocatalyst film 11 is configured to have a reflection suppressing function and an amphipathicity (to achieve a low contact angle with respect to both water and liquid paraffin) together with its original photocatalytic function. The amphipathicity of the photocatalyst film 11 is imparted, as can be explained by the theory of Wenzel, by an increase in surface roughness of the silicon oxide particles 16 caused by the adhesion of titanium oxide particles 15 (paragraphs 0033 to 0036).

For formation of the photocatalyst film disclosed in Patent Literature 1, electrostatic adhesion must be employed. Electrostatic adhesion is a method that requires coating twice for silicon oxide particles and for titanium oxide particles together with electrostatic charging operation for a substrate before film formation. Therefore, this method, when being applied to mass production, is problematic because of its low production efficiency and high production cost.

Electrostatic adhesion uses polycation composed of organic components such as PDDA and PSS for electrifying the substrate, but polycation is removed by subsequent sintering. Therefore, the photocatalyst film disclosed in Patent Literature 1 has a structure basically including no binder, as being different from a photocatalyst film formed by a sol-gel method. Such a photocatalyst film that lacks binders to be interposed between respective particles, or between a substrate and the particles, has insufficient film strength and thus is not of practical use, particularly, when long-term outdoor use is considered.

As described above, the photocatalyst film disclosed in Patent Literature 1 requires a high production cost and is not suitable for long-term use.

JP 2008-264777 A (Patent Literature 2) discloses a photocatalyst film containing silicon oxide particles, titanium oxide particles, and a binder component. This photocatalyst film can be formed by a sol-gel method. The binder component is added to a film forming solution in an amount of less than 10 parts by mass with respect to 100 parts by mass of the total amount of the silicon oxide particles, the titanium oxide particles, and the binder component, with reference to the state of hydrolyzable silicone. However, hydrolyzable silicone remains on the film after undergoing hydrolysis and polycondensation, and thus attention should be paid to the fact that the amount of the binder that forms the film practically should be less than the amount indicated with reference to the hydrolyzable silicone. For example, an indication of 10 parts by mass of hydrolyzable silicone in Table 2 as Example 9 of Patent Literature 2 (as a comparative example) means that the amount of the binder component in the film slightly falls below 10 parts by mass with reference to the state in terms of silicon oxide ($SiO_2$). In Patent Literature 2, the reason why the amount of the binder component is limited is to facilitate introduction of gases to be decomposed into the inside of the photocatalyst film by ensuring more voids between the particles (paragraph 0013). Therefore, Patent Literature 2 asserts that substantially no hydrolyzable silicone is preferably added (paragraph 0026).

In Patent Literature 2, the average particle diameter of titanium oxide particles is adjusted to at least 10 nm but not greater than 100 nm (claim 1), and the average particle diameter of silicon oxide particles (inorganic oxides particles) is adjusted to at least 10 nm but less than 40 nm (claim 4). In this way, the average particle diameter of silicon oxide particles is set such that it should not be equal to or more than 4 times the average particle diameter of titanium oxide particles, in Patent Literature 2. In the section of EXAMPLES in Patent Literature 2, silicon oxide particles having a lower average particle diameter than titanium oxide particles are selected. When silicon oxide particles are smaller than titanium oxide particles, silicon oxide particles can be easily interposed between the substrate and the titanium oxide particles. This is convenient in order to prevent an organic substrate from being eroded by titanium oxide particles, which is required to be considered according to Patent Literature 2 (paragraph 0014).

The photocatalyst film disclosed in Patent Literature 2 also has insufficient film strength because the amount of the binder is small.

JP 2010-134462 A (Patent Literature 3) discloses a photocatalyst film composed of a matrix of titanium dioxide. In the film, silicon oxide particles are embedded in the matrix. This photocatalyst film is formed by a sol-gel method.

The photocatalyst film disclosed in Patent Literature 3 contains silicon oxide particles, but does not contain titanium dioxide particles.

In the section of DETAILED DESCRIPTION OF THE INVENTION in Patent Literature 3, a photocatalyst film produced using silicon oxide particles having average spherical diameters of 10 nm to 15 nm and 18 nm to 30 nm is disclosed (paragraph 0107 and paragraph 0108). Since the silicon oxide particles are excessively small, the photocatalyst film disclosed in Patent Literature 3 has low abrasion resistance and insufficient film strength.

Patent Literature 3 also discloses a photocatalyst film produced using silicon oxide particles in the form of long and thin fibers having an average diameter of 10 nm to 15 nm and a length of 30 nm to 150 nm (paragraph 0111). In the photocatalyst film disclosed in Patent Literature 3, the silicon oxide particles may be in the form of fibers.

CITATION LIST

Patent Literatures

Patent Literature 1: JP 2006-162711 A
Patent Literature 2: JP 2008-264777 A
Patent Literature 3: JP 2010-134462 A

SUMMARY OF INVENTION

Technical Problem

It is an object of the present invention, in a glass article including a glass sheet and a photocatalyst film formed on the surface of the glass sheet in which the reflectance for the light incident on the glass sheet is reduced due to the photocatalyst film, to improve the film strength, specifically the abrasion resistance, of the photocatalyst film, thereby making the above-mentioned glass article suitable for long-term use, while maintaining a photocatalytic function and a reflection suppressing function of the photocatalyst film.

Solution to Problem

The present invention includes: a glass sheet; and a photocatalyst film formed on the surface of the glass sheet. The glass article has a reduced reflectance for light incident on the glass sheet due to the photocatalyst film. The photocatalyst film contains silicon oxide particles, titanium oxide particles, and a binder composed of silicon oxide component. In the photocatalyst film, the content of the silicon oxide particles falls in the range of 50 to 82 mass %, the content of the titanium oxide particles falls in the range of 8 to 40 mass %, and the content of the binder component falls in the range of 7 to 20 mass %, in the total amount of the silicon oxide particles, the titanium oxide particles, and the binder component. The silicon oxide particles have an average particle diameter that is at least 5 times the average particle diameter of the titanium oxide particles. Some of the silicon oxide particles contained in the photocatalyst film serve as protruding silicon oxide particles. Some of the titanium oxide particles contained in the photocatalyst film are interposed between the glass sheet and the protruding silicon oxide particles.

In this description, the protruding silicon oxide particles denote silicon oxide particles: 1) being not in contact with the glass sheet; 2) in the case where titanium oxide particles in contact with the silicon oxide particles are present, having their top portions at a position farther from the glass sheet than top portions of the titanium oxide particles that are in contact with the silicon oxide particles, while in the case where titanium oxide particles in contact with the silicon oxide particles are absent, having their top portions at a position farther from the glass sheet than top portions of titanium oxide particles closest to the silicon oxide particles; and 3) having their top portions exposed on a surface of the photocatalyst film.

Advantageous Effects of Invention

In the glass article according to the present invention, the film strength of the photocatalyst film is improved by allowing a binder component to be contained in at least a specific amount with respect to the total amount of the silicon oxide particles, the titanium oxide particles, and the binder component. Further, the surface area per unit mass of titanium oxide particles is ensured by allowing the titanium oxide particles to have a smaller average particle diameter relative to silicon oxide particles as well as allowing the titanium oxide particles to be contained in at least a specific amount with respect to the above-mentioned total amount, so that the photocatalytic function attributed to the titanium oxide particles should be prevented from deteriorating with the increase in the amount of the binder component. Furthermore, the silicon oxide particles are allowed to be contained in at least a specific amount, in order to ensure the film strength and exhibit the reflection suppressing function.

In the glass article according to the present invention, some of the silicon oxide particles are formed as protruding silicon oxide particles which protrude from the surrounding titanium oxide particles without being in contact with the glass sheet. Therefore, the silicon oxide particles that have a relatively large average particle diameter and that are stably retained in the film tend to serve as the portion on which stress to be applied to the film from the outside directly acts. Further, some of the titanium oxide particles penetrate between the glass sheet and the protruding silicon oxide particles, so that they are less likely to separate from the glass sheet even when stress is applied to the film. Thus, in the glass article of the present invention, the photocatalyst film has a film structure that also is suitable for ensuring the film strength.

DESCRIPTION OF EMBODIMENTS

Figure 1:
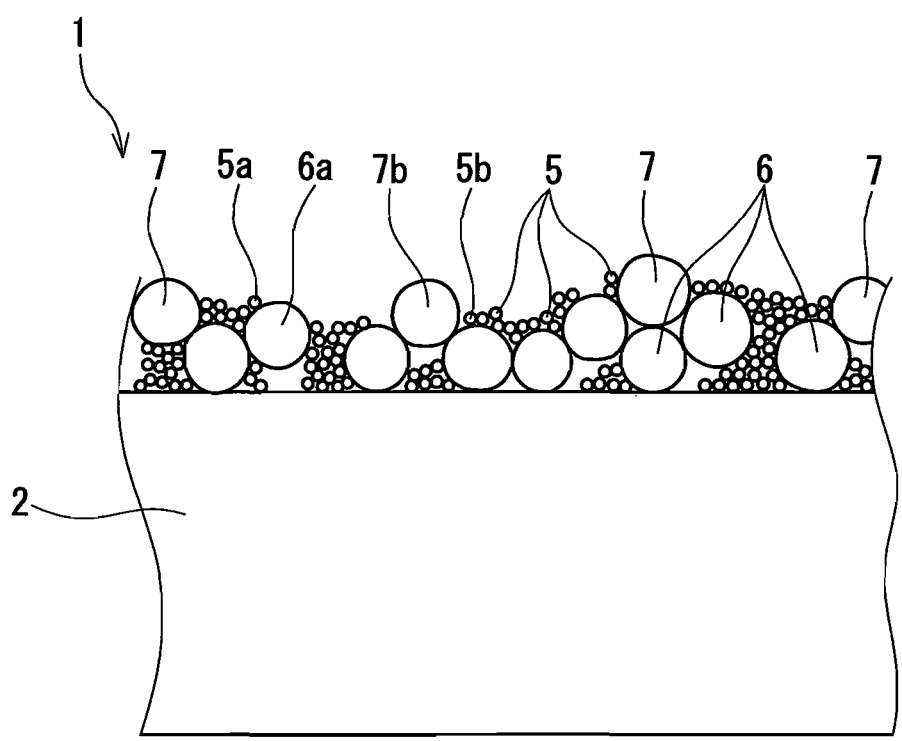
FIG. 1 is a sectional view showing an example of the glass article of the present invention.

As shown in FIG. 1, the glass article according to the present invention includes a glass sheet 2 and a photocatalyst film 1 formed on the surface of the glass sheet 2.

The photocatalyst film 1 contains titanium oxide particles 5 and silicon oxide particles 6, 7. The photocatalyst film 1 also contains a binder component composed of silicon oxide, which however is omitted in the figure. The binder component is present on the surface of particles, or at a contact portion between the respective particles or between the substrate and the particles. It serves to increase the bonding strength between the respective particles or between the substrate and the particles at the contact portion.

Particles that have been used conventionally for forming a photocatalyst film can be used, without particular limitation, for the respective particles (the titanium oxide particles 5, and the silicon oxide particles 6, 7) that form the photocatalyst film 1. However, the respective particles 5, 6, 7 are selected so that the silicon oxide particles 6, 7 have an average particle diameter that is at least 5 times the average particle diameter of the titanium oxide particles 5. When there is a difference in average particle diameter to such an extent, the titanium oxide particles 5 can penetrate easily into the voids in the film, particularly into the voids between the glass sheet 1 and the particles 6, 7, even when the silicon oxide particles 6, 7 that are relatively large are in contact with each other.

Assuming a case where three silicon oxide particles that are spheres completely in the same shape are at the closest packing and arranged in a single layer so that each particle is in contact with the other two particles in the plane, a titanium oxide particle that can penetrate between these three silicon oxide particles has a particle diameter of about 0.155 times the particle diameter of the silicon oxide particles (the particle diameter of the silicon oxide particles is about 6.5 times the particle diameter of the titanium oxide particle). However, the silicon oxide particles 6, 7 would never be at the closest packing arrangement in practice. Accordingly, when the average particle diameter of the silicon oxide particles 6, 7 is at least 5 times the average particle diameter of the titanium oxide particles 5, the titanium oxide particles 5 can penetrate sufficiently between the silicon oxide particles 6, 7, or between the substrate 2 and the particles 6, 7 in practice as mentioned above, though it of course is more preferable that the average particle diameter of the silicon oxide particles 6, 7 be at least 6.5 times the average particle diameter of the titanium oxide particles 5.

The average particle diameter of the silicon oxide particles 6, 7 is preferably at least 10 nm but not greater than 500 nm, more preferably at least 50 nm but not greater than 150 nm. When the average particle diameter of the silicon oxide particles 6, 7 is excessively large, there may be cases where not only a desired reflection suppressing function cannot be obtained but also the haze ratio (cloudiness) of the photocatalyst film 1 is excessively high. On the other hand, when the average particle diameter of the silicon oxide particles 6, 7 is excessively small, it is made difficult to maintain the ratio of the average particle diameter of the silicon oxide particles 6, 7 with respect to the average particle diameter of the titanium oxide particles 5 at a high level.

The average particle diameter of the titanium oxide particles 5 is preferably at least 5 nm but not more than 80 nm, more preferably at least 5 nm but not more than 20 nm. When the average particle diameter of the titanium oxide particles 5 is excessively large, it is made difficult to maintain the ratio of the average particle diameter of the titanium oxide particles 5 to the average particle diameter of the silicon oxide particles 6, 7 within a desired range. Further, when the average particle diameter of the titanium oxide particles 5 is excessively large, it is made difficult to ensure a large surface area per unit mass of titanium oxide, which may result in deterioration of the photocatalytic function. On the other hand, when the average particle diameter of the titanium oxide particles 5 is excessively small, there may be cases where the titanium oxide particles aggregate during preparation of a coating solution, resulting in a failure to obtain a uniform coating solution.

Here, a method for measuring the average particle diameter of particles in the film in this description is described. The average particle diameter is obtained through observation of the photocatalyst film 1 from a direction perpendicular to the surface of the glass sheet 2 using a SEM at a magnification of ×50,000 to ×500,000. Specifically, the longest diameter and the shortest diameter are measured for each of arbitrary 50 particles the entire image of which is observable. Then, the mean value of the longest diameter and the shortest diameter is taken as the particle diameter of each particle, and the mean value of the particle diameters of the 50 particles is taken as an average particle diameter.

The titanium oxide particles 5, and the silicon oxide particles 6, 7 each desirably have a uniform particle diameter. All of the titanium oxide particles 5 preferably have a particle diameter, expressed as a measured value based on the above-mentioned observation using a SEM, in the range of 2 to 100 nm, particularly 5 to 20 nm. Further, all of the silicon oxide particles 6, 7 preferably have a particle diameter, expressed as a measured value based on the above-mentioned observation, in the range of 20 to 250 nm, particularly 50 to 150 nm. Furthermore, each particle of the titanium oxide particles 5, and the silicon oxide particles 6, 7 is preferably substantially spherical. The term, substantially spherical, herein means that the ratio of the longest diameter to the shortest diameter (longest diameter/shortest diameter), expressed as measured values for the longest diameter and the shortest diameter based on the above-mentioned observation falls in the range of 1.0 to 1.5. The use of such substantially spherical particles can facilitate ensuring voids between the particles.

Some of the silicon oxide particles 7 (7b) are not directly in contact with the glass sheet 2, and are connected to the glass sheet 2 via the other particles 5, 6. Further, the top portions of the silicon oxide particles 7 (7b) are located at a higher position (upper side in the drawings) than the titanium oxide particles 5 that are present in the surroundings. More specifically, the silicon oxide particles 7 have their top portions at a higher position (a position farther from the glass sheet 2) than the top portions of the titanium oxide particles 5 that are in contact therewith, and the top portions of the silicon oxide particles 7 are exposed on the surface of the film. The silicon oxide particles 7b have their top portions at a higher position than the top portions of titanium oxide particles 5b that are closest thereto, though no titanium oxide particle is in contact therewith. As described above, these silicon oxide particles 7 (7b) are referred to as "protruding silicon oxide particles" in this description. The protruding silicon oxide particles 7 (7b) serve, when stress is applied to the film from the outside, to resist the stress. It should be noted that silicon oxide particles 6a shown in FIG. 1 do not fall under the protruding silicon oxide particles because they have their top portions at a lower position than the top portions of the titanium oxide particles 5a that are in contact therewith, though they are not in contact with the glass sheet 2.

In the shown embodiment, the protruding silicon oxide particles 7 are supported by the silicon oxide particles 6 that do not fall under the protruding silicon oxide particles 7, and are fixed to the glass sheet 2 via the silicon oxide particles 6. A binder component is interposed between the respective silicon oxide particles 6, 7, and between the glass sheet 2 and the silicon oxide particles 6, thereby stiffening the skeleton of the film (silicon oxide skeleton) composed of the particles 6, 7. A structure in which the protruding silicon oxide particles 7 are supported by the other silicon oxide particles 6 and are fixed to the glass sheet 2 (more specifically, a structure in which the protruding silicon oxide particles 7 are supported such that a path extending from the protruding silicon oxide particles 7 through only the silicon oxide particles 6 to the glass sheet 2 is present) is suitable for improving the film strength.

The larger the number of the protruding silicon oxide particles 7, the more the voids in the photocatalyst film 1 increase. The titanium oxide particles 5 that are relatively small penetrate into these voids. Thus, the titanium oxide particles 5 are mostly present at a position that is less likely to directly receive stress to be applied to the film from the outside, in the surroundings of the skeleton of the film composed of the silicon oxide particles 6, 7. Some of the titanium oxide particles 5 have penetrated into the voids formed below the protruding silicon oxide particles 7 between the glass sheet 2 and the protruding silicon oxide particles 7. When the titanium oxide particles 5 are present in these voids that are difficult for particles to penetrate into, it can be said that the titanium oxide particles 5 have penetrated sufficiently into the voids in the surroundings of the silicon oxide skeleton of the film. When a large number of the titanium oxide particles 5 penetrate into the voids between the glass sheet 2 and the silicon oxide particles 6, 7, the structure of the photocatalyst film 1 is made dense as a whole, resulting in an increase in resistance to the stress to be applied from the outside. Further, the fine titanium oxide particles 5 may tend to express their photocatalytic function by aggregation in some cases. One of the methods for allowing a large number of the titanium oxide particles 5 to penetrate into the voids to further facilitate aggregation is to add a surfactant to the film forming solution. Further, the addition of a surfactant improves the appearance of the film. This is presumably because the addition of a surfactant allows the titanium oxide particles to penetrate into the voids in the film, thereby making the film dense as a whole, which reduces the unevenness in color reflected from the film.

A part of the titanium oxide particles 5 are exposed on the surface of the film in an aggregated state above the silicon oxide particles 6 that do not fall under the protruding silicon oxide particles 7, though they are not present at a higher position than the top portions of the protruding silicon oxide particles 7 (substantially all, e.g., 95% or more, of the particles 5 are present below the outline to be formed by connecting the top portions of the protruding silicon oxide particles 7 to each other). The titanium oxide particles 5 aggregate into a porous state, because the binder component in the film is limited to a small amount. Thus, the photocatalytic function can be exerted more easily particularly at the portions exposed on the surface of the film.

The number of the protruding silicon oxide particles 7 to be present in an area of a 500 nm-square defined on the surface of the glass sheet 2 is preferably at least three, more preferably at least four, further preferably at least five. The number of the protruding silicon oxide particles 7 in the above-mentioned area can be counted through observation using a SEM.

As the binder component for the photocatalyst film 1, silicon oxide is suitably used. A binder composed of silicon oxide has high affinity for the glass sheet 2 and the silicon oxide particles 6, 7, and thus is suitable for strengthening the particles 6, 7. Further, the binder composed of silicon oxide has low refractive index, and thus is advantageous in the expression of the reflection suppressing function by the photocatalyst film 1.

Hydrolyzable silicone compounds represented by silicon alkoxide may be used as a source for supplying the binder composed of silicon oxide. Examples of silicon alkoxide include silicon tetramethoxide, silicon tetraethoxide, and silicon tetraisopropoxide. However, compounds known to be capable of forming silicon oxide by a sol-gel method can be used as a binder supplying source without particular limitation.

In the photocatalyst film 1, the content of the silicon oxide particles may be 50 to 82 mass %, the content of the titanium oxide particles may be 8 to 40 mass %, and the content of the binder component may be 7 to 20 mass %, in the total amount of the silicon oxide particles, the titanium oxide particles, and the binder component composed of silicon oxide. Alternatively, in the total amount, the silicon oxide particles may account for 50 to 82 mass %, the titanium oxide particles may account for 8 to 40 mass %, and the binder component may account for 8 to 20 mass %.

Preferably, in the total amount, the silicon oxide particles account for 60 to 82 mass %, the titanium oxide particles account for 8 to 25 mass %, and the binder component accounts for 10 to 20 mass %. Preferably, in the total amount, the silicon oxide particles account for 60 to 80 mass %, the titanium oxide particles account for 10 to 25 mass %, and the binder component accounts for 10 to 18 mass %.

Particularly preferably, in the total amount, the silicon oxide particles account for 50 to 57 mass %, the titanium oxide particles account for 30 to 40 mass %, and the binder component accounts for 8 to 14 mass %. In this case, it is easy to obtain particularly excellent properties of the photocatalytic function. Further, it is easy to obtain excellent properties of the reflection suppressing function, as well.

Furthermore, particularly preferably, in the total amount, the silicon oxide particles account for 65 to 75 mass %, the titanium oxide particles account for 13 to 23 mass %, and the binder component accounts for 10 to 16 mass %. Also in this case, it is easy to obtain particularly excellent properties of the reflection suppressing function. Further, it is easy to obtain excellent properties of the photocatalytic function, as well.

When the content of the silicon oxide particles is excessively high, the photocatalytic function may deteriorate due to the insufficiency of the titanium oxide particles, or the film strength may be reduced due to the insufficiency of the binder component. When the content of the silicon oxide particles is excessively low, the film strength may be reduced, or the reflection suppressing function may deteriorate. When the content of the titanium oxide particles is excessively high, the reflection suppressing function may deteriorate, or the film strength may be reduced. When the content of the titanium oxide particles is excessively low, the photocatalytic function cannot be obtained sufficiently. When the content of the binder component is excessively high, the photocatalytic function may deteriorate due to the binder component covering the portions where the titanium oxide particles aggregate into a porous state. When the content of the binder component is excessively low, the film strength cannot be obtained sufficiently.

The thickness of the photocatalyst film 1, for example, may be 20 nm to 500 nm, particularly 50 nm to 250 nm, though it is not particularly limited.

The photocatalyst film 1 can be formed by a sol-gel method using a forming solution (coating solution) containing silicon oxide particles, titanium oxide particles, and a binder supplying source. A specific example of formation of the photocatalyst film 1 by a sol-gel method is described in the following section, EXAMPLES.

EXAMPLES

Hereinafter, the present invention is described further in detail with reference to examples. First, the details of the test conducted to evaluate the properties of each glass article (glass sheet provided with photocatalyst film) produced in Examples and Comparative Examples are described.

<Evaluation of Optical Properties>

The optical transmittance and the optical reflectance were measured for each glass article using a spectrophotometer (manufactured by SHIMADZU CORPORATION UV-3100). The reflectance was measured with an optical beam incident on the measurement surface from the normal direction, while taking a surface formed with a photocatalyst film as a measurement surface, by introducing the directly reflected optical beam at a reflection angle of 8° into an integrating sphere. In this regard, in order to eliminate reflection from an unmeasured surface that is on the opposite side of the measurement surface (i.e., surface on which the photocatalyst film is not formed), the unmeasured surface was colored in black by spray paint. The transmittance was measured with an optical beam incident on the measurement surface by introducing the transmitted light into an integrating sphere without coloring the unmeasured surface in black. From the thus obtained transmission or reflection spectrum, an average transmittance and an average reflectance were calculated by averaging those respectively at a wavelength in the range of 400 to 1200 nm. Further, a change in the average transmittance accompanying the formation of the photocatalyst film was calculated. Specifically, an average transmittance was obtained also for a glass sheet in which no photocatalyst film was formed, in the same manner as above, a change in the average transmittance accompanying the formation of the photocatalyst film was calculated.

<Taber Abrasion Test>

The Taber abrasion test was carried out according to the abrasion test prescribed in JIS R3212. That is, a commercially available Taber abrasion tester (5150 ABRASER, manufactured by TABER INDUSTRIES) was used, and the photocatalyst film was subjected to 500 cycles while being brought into contact with abrasive wheels, CS-10F, under a load of 2.45 N. The total light transmittance was measured using HZ-1S manufactured by Suga Hest Instruments Co., Ltd. before and after the test, and a change in the total light transmittance resulting from the abrasion test was calculated. Further, the residual percentage of the film (area percentage of the film remaining after the test) was checked by visual inspection. As to the residual percentage of the film, 70% or more was evaluated as "A", at least 30% but less than 70% was evaluated as "B", and less than 30% was evaluated as "C".

<Reciprocating Abrasion Test>

The reciprocating abrasion test (EN abrasion test) was carried out according to the abrasion test prescribed in EN standard 1096-2:2001. That is, a plane abrasion tester (manufactured by DAIEI KAGAKU SEIKI MFG. CO., LTD) produced so as to meet the measurement conditions specified in EN-1096-2 was used, and a felt subjected to rotation at 6 rpm was reciprocated 500 times at an average speed of 7.2 m/minute while being pressed against the surface of the photocatalyst film under a load of 4 N. After the test, the state of film delamination was checked by visual inspection. The state where no film delamination occurred was evaluated as "a", and the state where partial film delamination occurred was evaluated as "b".

<Evaluation of Photo-Induced Hydrophilicity>

A change due to ultraviolet ray irradiation in the contact angle of a water droplet on the surface of the photocatalyst film was measured. Ultraviolet ray irradiation was carried out by irradiation with black light (with a main wavelength of 352 nm, 1 mW/cm$^2$) for 20 hours. The contact angle of a water droplet was measured using a DropMaster 300 (manufactured by Kyowa Interface Science Co., Ltd.). The surface of the film before the ultraviolet ray irradiation had been lightly wiped off with ethanol.

<Evaluation of Methylene Blue Degradation Activity>

The activity index for methylene blue degradation was evaluated according to the method prescribed in JIS R1703-2. A vacuum silicone grease was applied to the end face of a ring cell, and the ring cell was fixed to the surface of the photocatalyst film. 35 mL of a methylene blue aqueous solution (0.01 mmol/L) was put into the ring cell to bring the methylene blue aqueous solution into contact with the photocatalyst film, and a cover glass was placed on the cell. Using black light (with a main wavelength of 352 nm, 1 mW/cm$^2$), the area on the surface of the photocatalyst film to which the ring cell was fixed was irradiated with ultraviolet rays through the cover glass for 80 minutes. 3 mL of the above-mentioned aqueous solution was collected before and after the ultraviolet ray irradiation, and the absorbance was measured. Based on the change in the absorbance, the activity index for methylene blue degradation (unit: nmol/L·min) attributed to the photocatalyst film was calculated.

Example 1

27.6 g of ethylene glycol ethyl ether (organic solvent, manufactured by Sigma-Aldrich Corporation), 1.7 g of tetraethoxysilane (binder source: KBE-04, manufactured by Shin-Etsu Chemical Co., Ltd.), 15.3 g of a dispersion of fine particles of colloidal silica (PL-7, manufactured by FUSO CHEMICAL CO., LTD, with a solid content concentration 22.9% and a primary particle diameter (average particle diameter) of 75 nm, using water as a dispersion medium), 5.0 g of a dispersion of fine particles of titanium oxide (with a solid content concentration of 20% and a primary particle diameter (average particle diameter) of 10 nm, using water as a dispersion medium), and 0.4 g of 1N hydrochloric acid (hydrolysis catalyst) were weighed into a glass container, which was stirred in an oven maintained at 40° C. for 8 hours. Thus, a high concentration solution was obtained. In this high concentration solution, the solid content concentration was 10%, and the mass ratio of the silicon oxide particles (fine particles of colloidal silica), the titanium oxide fine particles, and the binder component in terms of $SiO_2$ was 70:20:10. Next, 245.1 g of isopropyl alcohol, 12.9 g of propylene glycol, 42.0 g of the high concentration solution were mixed. Thus, a coating solution (film forming solution) was prepared. In this coating solution, the solid content concentration was 1.4%.

Figure 2:
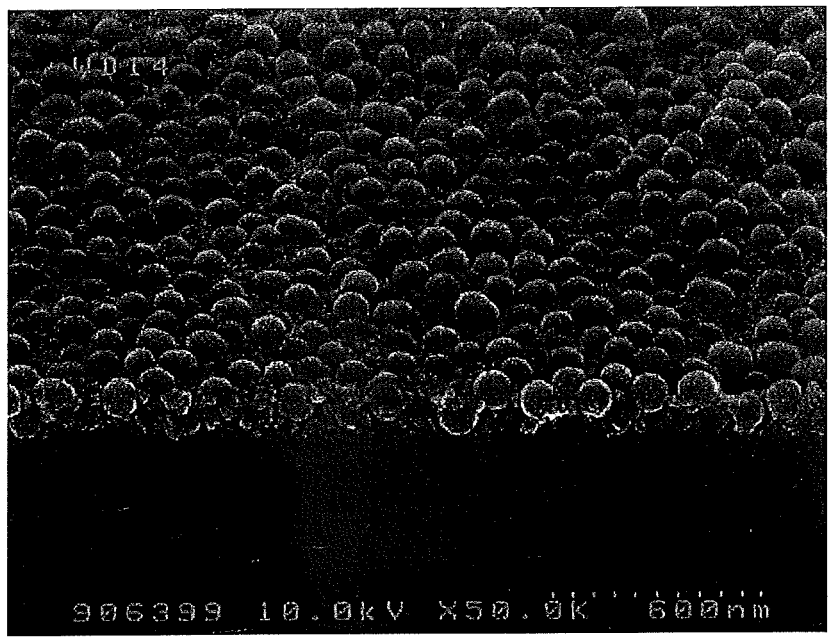
FIG. 2 is a view showing the state of the surface of a photocatalyst film obtained in Example 1 as observed using a SEM.

Subsequently, the coating solution was applied to the surface of a washed glass sheet (soda-lime glass of 300×100 mm with a thickness of 5 mm) by spray coating. The stirring of the coating solution was continued until immediately before the coating. The glass sheet to which the coating solution was applied was dried in an oven set at 300° C., and thereafter was sintered for 8 minutes in an electric furnace set at 610° C. For the thus obtained glass sheet with a photocatalyst film, the above-mentioned properties each were evaluated. Table 1 shows the evaluation results. Table 3 shows the added amount of the respective raw materials used in producing each of the high concentration solution and the coating solution, the solid content concentration of the high concentration solution, and the solid content concentration of the coating solution. Further, FIG. 2 shows the state of the formed photocatalyst film as observed using a SEM.

Example 2

Figure 3:
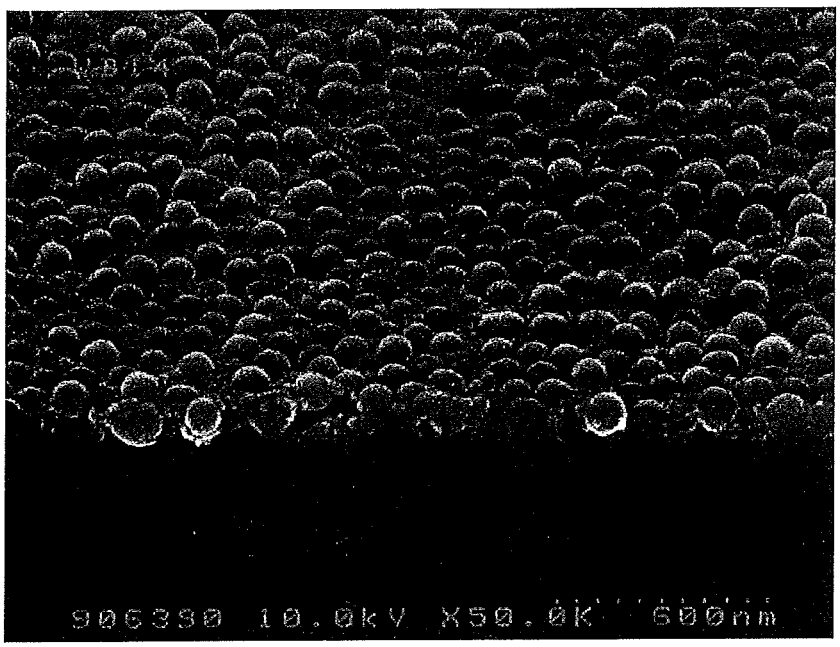
FIG. 3 is a view showing the state of a photocatalyst film obtained in Example 2 as observed using a SEM.

Using the respective raw materials shown in Table 3, a high concentration solution was prepared in the same manner as in Example 1, and then a coating solution was prepared. The added amount of the respective raw materials was as shown in Table 3. Further, a glass sheet with a photocatalyst film was obtained in the same manner as in Example 1. In Example 2, the mass ratio of the silicon oxide particles, the titanium oxide fine particles, and the binder component in terms of $SiO_2$ was 70:15:15. Table 1 shows the evaluation results for the thus obtained glass sheet with a photocatalyst film. Further, FIG. 3 shows the state of the formed photocatalyst film as observed using a SEM.

Example 3

Using the respective raw materials shown in Table 3, a high concentration solution was prepared in the same manner as in Example 1. The added amount of the respective raw materials was as shown in Table 3. Next, a coating solution was prepared using the respective raw materials shown in Table 3. Specifically, 240.8 g of isopropyl alcohol, 12.8 g of propylene glycol, 45.0 g of the high concentration solution, and 1.5 g of a surfactant (CoatOSil3505, manufactured by Momentive Performance Materials Inc.) diluted to 10% with isopropyl alcohol were mixed to prepare a coating solution, and the subsequent steps were performed in the same manner as in Example 1. Thus, a glass sheet with a photocatalyst film was obtained. In Example 3, the mass ratio of the silicon oxide particles, the titanium oxide fine particles, and the binder component in terms of $SiO_2$ was 70:15:15. The above-mentioned surfactant was a silicone-based surfactant. Table 1 shows the evaluation results for this glass sheet with a photocatalyst film.

Example 4

Figure 4:
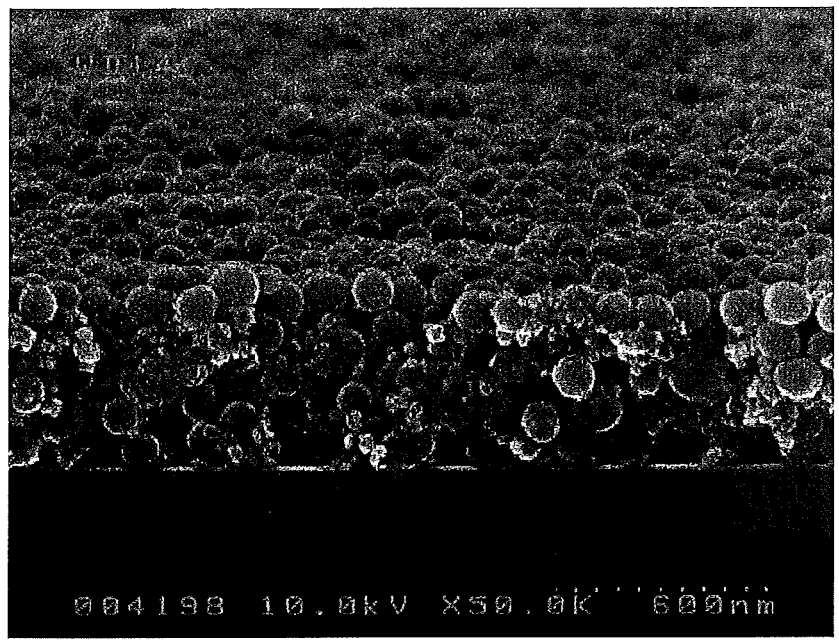
FIG. 4 is a view showing the state of a photocatalyst film obtained in Example 4 as observed using a SEM.

Using the respective raw materials shown in Table 3, a high concentration solution was prepared in the same manner as in Example 1. Next, a coating solution was prepared in the same manner as in Example 3, using the respective raw materials shown in Table 3. The added amount of the respective raw materials was as shown in Table 3. Further, a glass sheet with a photocatalyst film was obtained in the same manner as in Example 1. In Example 4, the mass ratio of the silicon oxide particles, the titanium oxide fine particles, and the binder component in terms of $SiO_2$ was 55.2:35:9.8. Table 1 shows the evaluation results for this glass sheet with a photocatalyst film. Further, FIG. 4 shows the state of the formed photocatalyst film as observed using a SEM.

Example 5

Using the respective raw materials shown in Table 3, a high concentration solution was prepared in the same manner as in Example 1. Next, a coating solution was prepared in the same manner as in Example 3, using the respective raw materials shown in Table 3. The added amount of the respective raw materials was as shown in Table 3. Further, a glass sheet with a photocatalyst film was obtained in the same manner as in Example 1. In Example 5, the mass ratio of the silicon oxide particles, the titanium oxide fine particles, and the binder component in terms of $SiO_2$ was 54.4:34.8:10.8. Table 1 shows the evaluation results for this glass sheet with a photocatalyst film.

Example 6

Using the respective raw materials shown in Table 3, a high concentration solution was prepared in the same manner as in Example 1. Next, a coating solution was prepared in the same manner as in Example 3, using the respective raw materials shown in Table 3. The added amount of the respective raw materials was as shown in Table 3. Further, a glass sheet with a photocatalyst film was obtained in the same manner as in Example 1. In Example 6, the mass ratio of the silicon oxide particles, the titanium oxide fine particles, and the binder component in terms of $SiO_2$ was 61.4:27.8:10.8. Table 1 shows the evaluation results for this glass sheet with a photocatalyst film.

Example 7

Using the respective raw materials shown in Table 3, a high concentration solution was prepared in the same manner as in Example 1. Next, a coating solution was prepared in the same manner as in Example 3, using the respective raw materials shown in Table 3. The added amount of the respective raw materials was as shown in Table 3. Further, a glass sheet with a photocatalyst film was obtained in the same manner as in Example 1. In Example 7, the mass ratio of the silicon oxide particles, the titanium oxide fine particles, and the binder component in terms of $SiO_2$ was 51.5:35.5:13. Table 1 shows the evaluation results for this glass sheet with a photocatalyst film.

Example 8

Using the respective raw materials shown in Table 3, a high concentration solution was prepared in the same manner as in Example 1. Next, a coating solution was prepared in the same manner as in Example 3, using the respective raw materials shown in Table 3. The added amount of the respective raw materials was as shown in Table 3. Further, a glass sheet with a photocatalyst film was obtained in the same manner as in Example 1. In Example 8, the mass ratio of the silicon oxide particles, the titanium oxide fine particles, and the binder component in terms of $SiO_2$ was 57.5:35:7.5. Table 1 shows the evaluation results for this glass sheet with a photocatalyst film.

Example 9

Using the respective raw materials shown in Table 4, a high concentration solution was prepared in the same manner as in Example 1. Next, a coating solution was prepared in the same manner as in Example 3, using the respective raw materials shown in Table 4. The added amount of the respective raw materials was as shown in Table 4. Further, a glass sheet with a photocatalyst film was obtained in the same manner as in Example 1. In Example 9, the mass ratio of the silicon oxide particles, the titanium oxide fine particles, and the binder component in terms of $SiO_2$ was 58:31:11. Table 2 shows the evaluation results for this glass sheet with a photocatalyst film.

Example 10

Using the respective raw materials shown in Table 4, a high concentration solution was prepared in the same manner as in Example 1. Next, a coating solution was prepared in the same manner as in Example 3, using the respective raw materials shown in Table 4. The added amount of the respective raw materials was as shown in Table 4. Further, a glass sheet with a photocatalyst film was obtained in the same manner as in Example 1. In Example 10, the mass ratio of the silicon oxide particles, the titanium oxide fine particles, and the binder component in terms of $SiO_2$ was 52.5:38:9.5. Table 2 shows the evaluation results for this glass sheet with a photocatalyst film.

Example 11

Using the respective raw materials shown in Table 4, a high concentration solution was prepared in the same manner as in Example 1. Next, a coating solution was prepared in the same manner as in Example 3, using the respective raw materials shown in Table 4. The added amount of the respective raw materials was as shown in Table 4. Further, a glass sheet with a photocatalyst film was obtained in the same manner as in Example 1. In Example 11, the mass ratio of the silicon oxide particles, the titanium oxide fine particles, and the binder component in terms of $SiO_2$ was 51:39:10. Table 2 shows the evaluation results for this glass sheet with a photocatalyst film.

Example 12

Using the respective raw materials shown in Table 4, a high concentration solution was prepared in the same manner as in Example 1. Next, a coating solution was prepared in the same manner as in Example 1, using the respective raw materials shown in Table 4. The added amount of the respective raw materials was as shown in Table 4. Further, a glass sheet with a photocatalyst film was obtained in the same manner as in Example 1. In Example 12, the mass ratio of the silicon oxide particles, the titanium oxide fine particles, and the binder component in terms of $SiO_2$ was 55:35:10. Table 2 shows the evaluation results for this glass sheet with a photocatalyst film.

Comparative Example 1

Figure 5:
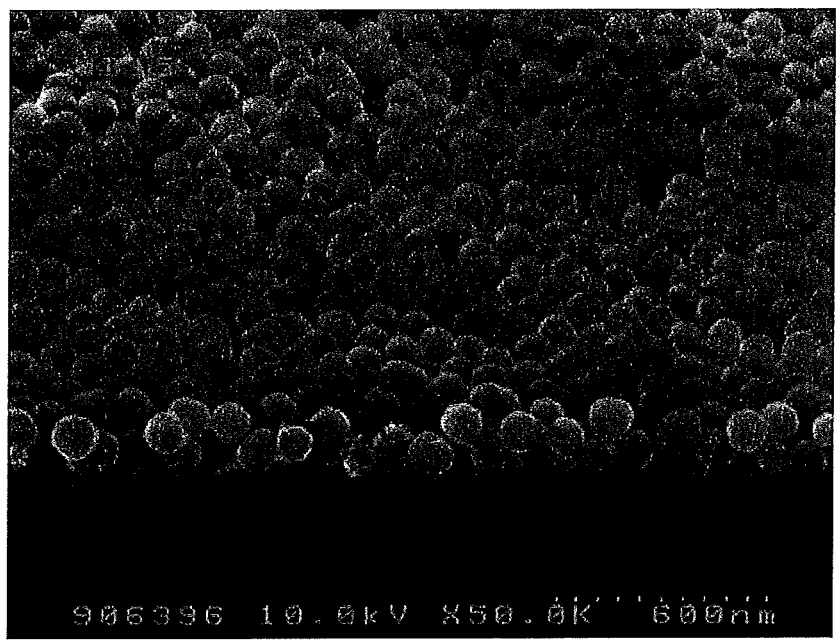
FIG. 5 is a view showing the state of a photocatalyst film obtained in Comparative Example 1 as observed using a SEM.
Figure 6:
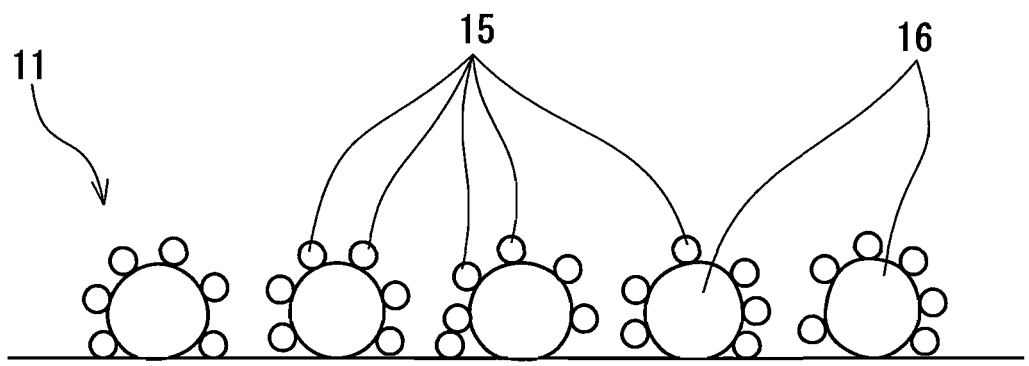
FIG. 6 is a sectional view illustrating a photocatalyst film disclosed in JP 2006-162711 A (Patent Literature 1).

27.7 g of ethylene glycol ethyl ether, 0.9 g of tetraethoxysilane, 18.6 g of a dispersion of fine particles of colloidal silica, 2.5 g of a dispersion of fine particles of titanium oxide, and 0.4 g of 1N hydrochloric acid were weighed into a glass container, which was stirred in an oven maintained at 40° C. for 8 hours. Thus, a high concentration solution was obtained. In this high concentration solution, the solid content concentration was 10%. Further, the manufacturers and the product numbers of the respective raw materials were as shown in Example 1. Next, 248.0 g of isopropyl alcohol, 13.1 g of propylene glycol, and 39.0 g of the high concentration solution were mixed to prepare a coating solution, and the subsequent steps were performed in the same manner as in Example 1. Thus, a glass sheet with a photocatalyst film was obtained. In Comparative Example 1, the mass ratio of the silicon oxide particles, the titanium oxide fine particles, and the binder component in terms of $SiO_2$ was 85:10:5. In the coating solution, the solid content concentration was 1.3%. Table 2 shows the evaluation results for this glass sheet with a photocatalyst film. Table 4 shows the added amount of the respective raw materials used in producing each of the high concentration solution and the coating solution, the solid content concentration of the high concentration solution, and the solid content concentration of the coating solution. In Comparative Example 1, the entire film was lost from the glass sheet as a result of the Taber abrasion test (residual percentage: 0%), and thus the change in the optical transmittance before and after the test was not measured. FIG. 5 shows the state of the formed photocatalyst film as observed using a SEM.

Comparative Example 2

Using the respective raw materials shown in Table 4, a high concentration solution was prepared in the same manner as in Comparative Example 1. The added amount of the respective raw materials was as shown in Table 4. Next, a coating solution was prepared using the respective raw materials shown in Table 4. Specifically, 247.4 g of isopropyl alcohol, 13.1 g of propylene glycol, 39.0 g of the high concentration solution, and 0.6 g of a surfactant (CoatOSil1211, manufactured by Momentive Performance Materials Inc.) diluted to 10% with isopropyl alcohol were mixed to prepare a coating solution, and the subsequent steps were performed in the same manner as in Example 1. Thus, a glass sheet with a photocatalyst film was obtained. In Comparative Example 2, the mass ratio of the silicon oxide particles, the titanium oxide fine particles, and the binder component in terms of $SiO_2$ was 85:10:5, as in Comparative Example 1. In the coating solution, the solid content concentration was 1.3%. The above-mentioned surfactant was a silicone-based surfactant. Table 2 shows the evaluation results for this glass sheet with a photocatalyst film. Also in Comparative Example 2, the entire film was lost from the glass sheet as a result of the Taber abrasion test (residual percentage: 0%), and thus the change in the optical transmittance before and after the test was not measured.

Comparative Example 3

Using the respective raw materials shown in Table 4, a high concentration solution was prepared in the same manner as in Comparative Example 1, and then a coating solution was prepared. The added amount of the respective raw materials was as shown in Table 4. Further, a glass sheet with a photocatalyst film was obtained in the same manner as in Example 1. In Comparative Example 3, the mass ratio of the silicon oxide particles, the titanium oxide fine particles, and the binder component in terms of $SiO_2$ was 85:5:10. Table 2 shows the evaluation results for this glass sheet with a photocatalyst film.

Comparative Example 4

Using the respective raw materials shown in Table 4, a high concentration solution was prepared in the same manner as in Comparative Example 1. Next, a coating solution was prepared in the same manner as in Comparative Example 2, using the respective raw materials shown in Table 4. The added amount of the respective raw materials was as shown in Table 4. Further, a glass sheet with a photocatalyst film was obtained in the same manner as in Example 1. In Comparative Example 4, the mass ratio of the silicon oxide particles, the titanium oxide fine particles, and the binder component in terms of $SiO_2$ was 70:0:30. Table 2 shows the evaluation results for this glass sheet with a photocatalyst film.

Comparative Example 5

Using the respective raw materials shown in Table 4, a high concentration solution was prepared in the same manner as in Comparative Example 1. Next, a coating solution was prepared in the same manner as in Comparative Example 2, using the respective raw materials shown in Table 4. The added amount of the respective raw materials was as shown in Table 4. Further, a glass sheet with a photocatalyst film was obtained in the same manner as in Example 1. In Comparative Example 5, the mass ratio of the silicon oxide particles, the titanium oxide fine particles, and the binder component in terms of $SiO_2$ was 48.5:36:15.5. Table 2 shows the evaluation results for this glass sheet with a photocatalyst film.

TABLE 1

|  | EX. 1 | EX. 2 | EX. 3 | EX. 4 | EX. 5 | EX. 6 | EX. 7 | EX. 8 |
|---|---|---|---|---|---|---|---|---|
| $SiO_2$ [Parts by mass] | 70.0 | 70.0 | 70.0 | 55.2 | 54.4 | 61.4 | 51.5 | 57.5 |
| $TiO_2$ [Parts by mass] | 20.0 | 15.0 | 15.0 | 35.0 | 34.8 | 27.8 | 35.5 | 35.0 |
| Binder component [Parts by mass] | 10.0 | 15.0 | 15.0 | 9.8 | 10.8 | 10.8 | 13.0 | 7.5 |
| Surfactant |  |  |  |  |  |  |  |  |
| Upper: Type | — | — | CS3505 | CS3505 | CS3505 | CS3505 | CS3505 | CS3505 |
| Lower: Concentration in coating solution [wt %] |  |  | 0.05 | 0.05 | 0.05 | 0.05 | 0.05 | 0.05 |
| Difference from average transmittance of glass sheet [%] | 1.77 | 1.48 | 1.15 | 1.70 | 1.89 | 1.61 | 1.38 | 1.75 |
| Average reflectance at wavelength of 400 to 1200 nm [%] | 2.52 | 2.64 | 3.07 | 2.42 | 2.37 | 2.51 | 2.86 | 2.37 |
| Change in transmittance before and after Taber abrasion test [%] | −1.4 | −1.2 | −1.1 | −1.5 | −1.6 | −2.0 | −1.3 | −1.8 |
| Film state after Taber abrasion test | B | A | A | B | B | B | B | B |
| Film state after EN abrasion test | a | a | a | a | a | a | a | a |
| Photo-induced hydrophilicity (change in contact angle of water) [°] |  |  |  |  |  |  |  |  |
| Upper: Initial value | 7.9 | 8.3 | 10.7 | 9.1 | 17.9 | 10.8 | 9.0 | 8.9 |
| Lower: After ultraviolet ray irradiation | 2.3 | 2.3 | 2.8 | 2.3 | 2.3 | 2.8 | 2.6 | 2.8 |
| Activity index for methylene blue degradation [nmol/L · min] | 6.0 | 3.0 | 5.0 | 9.0 | 7.5 | 4.3 | 7.3 | 8.4 |

A: Residual percentage of 70% or more
B: Residual percentage of at least 30% but less than 70%
C: Residual percentage of less than 30%
a: No film delamination occurred
b: Partial film delamination occurred

TABLE 2

|  | EX. 9 | EX. 10 | EX. 11 | EX. 12 | C.EX. 1 | C.EX. 2 | C.EX. 3 | C.EX. 4 | C.EX. 5 |
|---|---|---|---|---|---|---|---|---|---|
| $SiO_2$ [Parts by mass] | 58.0 | 52.5 | 51.0 | 55.0 | 85.0 | 85.0 | 85.0 | 70.0 | 48.5 |
| $TiO_2$ [Parts by mass] | 31.0 | 38.0 | 39.0 | 35.0 | 10.0 | 10.0 | 5.0 | 0.0 | 36.0 |
| Binder component [Parts by mass] | 11.0 | 9.5 | 10.0 | 10.0 | 5.0 | 5.0 | 10.0 | 30.0 | 15.5 |
| Surfactant |  |  |  |  |  |  |  |  |  |
| Upper: Type | CS3505 | CS3505 | CS3505 | — | — | CS1211 | — | CS3505 | CS3505 |
| Lower: Concentration in coating solution [wt %] | 0.05 | 0.05 | 0.05 |  |  | 0.02 |  | 0.05 | 0.05 |
| Difference from average transmittance of glass sheet [%] | 1.61 | 1.62 | 1.59 | 1.98 | 2.07 | 1.57 | 2.02 | 1.69 | 1.08 |
| Average reflectance at wavelength of 400 to 1200 nm [%] | 2.70 | 2.69 | 2.71 | 2.15 | 2.07 | 2.43 | 2.02 | 2.68 | 3.19 |
| Change in transmittance before and after Taber abrasion test [%] | −1.4 | −1.7 | −1.6 | −1.4 | — | — | −1.6 | −1.0 | −1.1 |
| Film state after Taber abrasion test | B | B | B | B | C | C | A | A | A |
| Film state after EN abrasion test | a | a | a | a | b | b | a | a | a |
| Photo-induced hydrophilicity (change in contact angle of water) [°] |  |  |  |  |  |  |  |  |  |
| Upper: Initial value | 9.2 | 10.3 | 11.2 | 8.8 | 9.4 | 12.5 | 9.8 | 53.5 | 9.7 |
| Lower: After ultraviolet ray irradiation | 2.4 | 2.2 | 2.0 | 2.5 | 2.9 | 2.7 | 9.2 | 53.9 | 2.4 |
| Activity index for methylene blue degradation [nmol/L · min] | 5.9 | 10.6 | 11.4 | 8.6 | 3.0 | 4.0 | 0.5 | 0.0 | 7.2 |

A: Residual percentage of 70% or more
B: Residual percentage of at least 30% but less than 70%
C: Residual percentage of less than 30%
a: No film delamination occurred
b: Partial film delamination occurred

TABLE 3

|  | EX. 1 | EX. 2 | EX. 3 | EX. 4 | EX. 5 | EX. 6 | EX. 7 | EX. 8 |
|---|---|---|---|---|---|---|---|---|
| Preparation of high concentration solution |  |  |  |  |  |  |  |  |
| Ethylene glycol ethyl ether [g] | 27.6 | 27.9 | 27.9 | 29.9 | 29.7 | 29.6 | 29.6 | 29.8 |
| Tetraethoxysilane [g] | 1.7 | 2.6 | 2.6 | 1.7 | 1.9 | 1.9 | 2.7 | 1.3 |
| Dispersion of fine particles of colloidal silica [g] | 15.3 | 15.3 | 15.3 | 12.1 | 12.1 | 13.4 | 11.2 | 12.6 |
| Dispersion of fine particles of titanium oxide [g] | 5.0 | 3.8 | 3.8 | 5.8 | 5.8 | 4.6 | 6.0 | 5.8 |

TABLE 3-continued

|  | EX. 1 | EX. 2 | EX. 3 | EX. 4 | EX. 5 | EX. 6 | EX. 7 | EX. 8 |
|---|---|---|---|---|---|---|---|---|
| 1N hydrochloric acid [g] | 0.4 | 0.4 | 0.5 | 0.5 | 0.5 | 0.5 | 0.5 | 0.5 |
| Solid content concentration in high concentration solution [%] | 10.0 | 10.0 | 10.0 | 10.0 | 10.0 | 10.0 | 10.0 | 10.0 |
| Preparation of coating solution |  |  |  |  |  |  |  |  |
| Isopropyl alcohol [g] | 245.1 | 245.1 | 240.8 | 226.5 | 232.2 | 232.2 | 240.8 | 240.8 |
| Propylene glycol [g] | 12.9 | 12.9 | 12.8 | 12.0 | 12.3 | 12.3 | 12.8 | 12.8 |
| High concentration solution [g] | 42.0 | 42.0 | 45.0 | 60.0 | 54.0 | 54.0 | 45.0 | 45.0 |
| Type of surfactant | — | — | CS3505 | CS3505 | CS3505 | CS3505 | CS3505 | CS3505 |
| Added amount of surfactant solution [g] | — | — | 1.5 | 1.5 | 1.5 | 1.5 | 1.5 | 1.5 |
| Solid content concentration in coating solution [%] | 1.4 | 1.4 | 1.5 | 2.0 | 1.8 | 1.7 | 1.5 | 1.5 |

TABLE 4

|  | EX. 9 | EX. 10 | EX. 11 | EX. 12 | C.EX. 1 | C.EX. 2 | C.EX. 3 | C.EX. 4 | C.EX. 5 |
|---|---|---|---|---|---|---|---|---|---|
| Preparation of high concentration solution |  |  |  |  |  |  |  |  |  |
| Ethylene glycol ethyl ether [g] | 29.8 | 30.1 | 30.1 | 29.9 | 27.7 | 27.6 | 28.1 | 29.0 | 30.2 |
| Tetraethoxysilane [g] | 1.9 | 1.6 | 1.7 | 1.7 | 0.9 | 0.9 | 1.7 | 5.2 | 2.7 |
| Dispersion of fine particles of colloidal silica [g] | 12.7 | 11.5 | 11.1 | 12.0 | 18.6 | 18.6 | 18.6 | 15.3 | 10.6 |
| Dispersion of fine particles of titanium oxide [g] | 5.2 | 6.3 | 6.5 | 5.8 | 2.5 | 2.5 | 1.3 | 0.0 | 6.0 |
| 1N hydrochloric acid [g] | 0.5 | 0.5 | 0.5 | 0.5 | 0.4 | 0.5 | 0.4 | 0.5 | 0.5 |
| Solid content concentration in high concentration solution [%] | 10.0 | 10.0 | 10.0 | 10.0 | 10.0 | 10.0 | 10.0 | 10.0 | 10.0 |
| Preparation of coating solution |  |  |  |  |  |  |  |  | — |
| Isopropyl alcohol [g] | 232.2 | 235.1 | 235.1 | 242.3 | 248.0 | 247.4 | 248.0 | 235.1 | 240.8 |
| Propylene glycol [g] | 12.3 | 12.5 | 12.5 | 12.8 | 13.1 | 13.1 | 13.1 | 12.5 | 12.8 |
| High concentration solution [g] | 54.0 | 51.0 | 51.0 | 45.0 | 39.0 | 39.0 | 39.0 | 51 | 45.0 |
| Type of surfactant | CS3505 | CS3505 | CS3505 | — | — | CS1211 | — | CS3505 | CS3505 |
| Added amount of surfactant solution [g] | 1.5 | 1.5 | 1.5 | — | — | 0.6 | — | 1.5 | 1.5 |
| Solid content concentration in coating solution [%] | 1.8 | 1.7 | 1.7 | 1.5 | 1.3 | 1.3 | 1.3 | 1.7 | 1.5 |

Every glass sheet with a photocatalyst film obtained from Examples 1 to 12 has a photocatalytic function and a reflection suppressing function. The glass sheet with a photocatalyst film obtained from Examples 1 to 12 has an average reflectance of 3.1% or less at a wavelength of 400 to 1200 nm, and thus has preferable properties for the reflection suppressing function. When the average reflectance is 2.9% or less at a wavelength of 400 to 1200 nm, the glass sheet has further preferable properties for the reflection suppressing function. Further, the glass sheet with a photocatalyst film obtained from Examples 1 to 12 has an activity index for methylene blue degradation of 3 nmol/L·min or more, and thus has excellent properties for the photocatalytic function. Furthermore, in the glass sheet with a photocatalyst film obtained from Examples 1 to 12, at least a part of the film remained thereon even after the Taber abrasion test, and the film was not delaminated therefrom even after the EN abrasion test. It can be observed using a SEM (FIG. 2 to FIG. 4) that a number of protruding silicon oxide particles are present in the photocatalyst film according to Examples. The locally thick portions in the photocatalyst film are composed of the protruding silicon oxide particles, and at least five protruding silicon oxide particles are present in an area of a 500 nm-square defined on the surface of the glass sheet even at the lowest estimate. It also can be seen that the protruding silicon oxide particles are fixed to the glass sheet by being supported by a plurality of silicon oxide particles. Further, the following can be observed: the titanium oxide particles aggregate between the respective silicon oxide particles and between the substrate and the silicon oxide particles; some of the titanium oxide particles are interposed between the glass sheet and the protruding silicon oxide particles; and some other titanium oxide particles are exposed on the surface of the film in an aggregated state. The titanium oxide particles aggregate into a porous state where voids between the particles are ensured because of the small amount of the binder. Further, substantially all (at least 95% on the basis of the number) the titanium oxide particles are present below the plane formed by connecting the top portions of the protruding silicon oxide particles to each other.

The presence of the protruding silicon oxide particles on the top surface of the photocatalyst film is presumably one contributing factor to express an excellent reflection suppressing function while having high abrasion resistance. Further, the presence of the titanium oxide particles, not on the top surface of the photocatalyst film, but in the vicinity of the top surface is presumably one contributing factor to express an excellent photocatalytic function.

When Example 2 and Example 3 are compared to each other, it can be seen that the change in the optical transmittance after the Taber abrasion test was slightly decreased due to the addition of the surfactant. This is presumably because the addition of the surfactant allowed the titanium oxide particles to penetrate into the voids in the film, thus making the film dense. Further, the above-mentioned comparison reveals that the addition of the surfactant has improved the activity index for methylene blue degradation. In order to specify the cause for this, the film structure was analyzed further in detail.

As a result, it was found that the portions where the titanium oxide particles aggregate had been increased due to the addition of the surfactant. It can be presumed that the portions where the titanium oxide particles aggregate into a porous state contributed to the methylene blue degradation.

It also was confirmed, from the results of the observation of the photocatalyst film according to Examples using a SEM, that the photocatalyst film had a thickness in the range of 100 to 200 nm, and the silicon oxide particles and the titanium oxide particles each were substantially spherical with an average particle diameter almost identical to the value mentioned above for the raw material.

INDUSTRIAL APPLICABILITY

According to the present invention, it is possible to provide a glass article that includes a photocatalyst film having improved film strength. This glass article is extensively useful, but it shows a great value particularly when used as a glass article intended for long-term outdoor use, such as cover glass for a solar cell and glass for a greenhouse,

The invention claimed is:

1. A glass article comprising:
   a glass sheet; and
   a photocatalyst film formed on a surface of the glass sheet, wherein the glass article has a reduced reflectance for light incident on the glass sheet due to the photocatalyst film,
   the photocatalyst film contains silicon oxide particles, titanium oxide particles, and a binder composed of silicon oxide component,
   the content of the silicon oxide particles falls in the range of 50 to 82 mass %, the content of the titanium oxide particles falls in the range of 8 to 40 mass %, and the content of the binder component falls in the range of 7 to 20 mass %, in the total amount of the silicon oxide particles, the titanium oxide particles, and the binder component,
   the silicon oxide particles have an average particle diameter that is at least 5 times an average particle diameter of the titanium oxide particles,
   some of the silicon oxide particles contained in the photocatalyst film serve as protruding silicon oxide particles, and
   some of the titanium oxide particles contained in the photocatalyst film are interposed between the glass sheet and the protruding silicon oxide particles,
       where the protruding silicon oxide particles denote silicon oxide particles: 1) being not in contact with the glass sheet; 2) in the case where titanium oxide particles in contact with the silicon oxide particles are present, having their top portions at a position farther from the glass sheet than top portions of the titanium oxide particles that are in contact with the silicon oxide particles, while in the case where titanium oxide particles in contact with the silicon oxide particles are absent, having their top portions at a position farther from the glass sheet than top portions of titanium oxide particles closest to the silicon oxide particles; and 3) having their top portions exposed on a surface of the photocatalyst film.

2. The glass article according to claim 1, wherein
the content of the silicon oxide particles falls in the range of 50 to 57 mass %, the content of the titanium oxide particles falls in the range of 30 to 40 mass %, and the content of the binder component falls in the range of 8 to 14 mass %, in the total amount of the silicon oxide particles, the titanium oxide particles, and the binder component.

3. The glass article according to claim 1, wherein
the content of the silicon oxide particles falls in the range of 60 to 82 mass %, the content of the titanium oxide particles falls in the range of 8 to 25 mass %, and the content of the binder component falls in the range of 10 to 20 mass %, in the total amount of the silicon oxide particles, the titanium oxide particles, and the binder component.

4. The glass article according to claim 3, wherein
the content of the silicon oxide particles falls in the range of 65 to 75 mass %, the content of the titanium oxide particles falls in the range of 13 to 23 mass %, and the content of the binder component falls in the range of 10 to 16 mass %, in the total amount of the silicon oxide particles, the titanium oxide particles, and the binder component.

5. The glass article according to claim 1, wherein
four or more of the protruding silicon oxide particles are present in an area of a 500 nm-square defined on a surface of the glass sheet.

6. The glass article according to claim 1, wherein
the protruding silicon oxide particles are fixed to the glass sheet via silicon oxide particles that do not fall under the protruding silicon oxide particles.

7. The glass article according to claim 1, wherein
a part of the titanium oxide particles contained in the photocatalyst film are exposed on a surface of the photocatalyst film in an aggregated state above the silicon oxide particles that do not fall under the protruding silicon oxide particles.

* * * * *